Patented Dec. 15, 1942

2,305,549

UNITED STATES PATENT OFFICE 2,305,549

PROCESS OF EXTRACTING WEAK ORGANIC ACIDS FROM THEIR SOLUTION IN A WATER-IMMISCIBLE LIQUID

Alan C. Nixon, Berkeley, Calif., assignor to Shell Development Company, San Francisco, Calif., a corporation of Delaware No Drawing. Application January 13, 1941, Serial No. 374,205

7 Claims. (Cl. 196—30)

This invention relates to the art of refining hydrocarbons by extraction with alkaline solutions, and more especially to the solutizer process for sweetening gasoline.

Relatively concentrated alkaline solutions, particularly aqueous solutions of alkali metal hydroxides, are often used in the refining of organic liquids, which are water-insoluble or easily salted out from aqueous solutions and do not react with alkalis, to remove therefrom objectionable acidic substances. Such liquids are, for example, petroleum or coal tar hydrocarbons like gasoline, kerosene, benzene, toluene, xylene, substituted normally liquid hydrocarbons which are substantially insoluble in water, for instance, chlorinated hydrocarbons, of which chlorethane, ethylene dichloride, trichlorethylene, carbon tetrachloride, chlorpropane, chlorbutylene, chlorbenzene, brombenzene, are examples; or nitrogen-containing hydrocarbons such as amyl or higher amines, aniline, pyridine and derivatives, petroleum bases, etc. In general, the aqueous solution of the alkali is mixed with the hydrocarbon until a more or less fine dispersion is formed, and after sufficient contact the mixture is allowed to settle. During the process of mixing the two phases often form troublesome emulsions which break only very slowly.

The complete separation of the two liquids is, however, necessary in most cases for subsequent operations. A more persistent emulsion is an obvious nuisance which delays the parting of the two phases and requires either additional time or additional settling vessels.

In a continuous process, such as the solutizer process of desulfurizing sour gasoline, a hydrocarbon liquid is contacted in a countercurrent system with a concentrated alkaline solution and a limited space is provided for the separation of the two phases. Aqueous alkaline droplets may, however, be carried over with the gasoline phase if the emulsion becomes more stable or if the throughput is increased, and the entrained alkali is not only lost but may cause trouble in subsequent steps.

The object of this invention is to improve the treatment of hydrocarbons by means of alkaline solutions and to produce a faster and more complete separation of emulsions formed by those liquids upon contact with each other. A more particular object of my invention is to prevent the carry-over of the aqueous phase during the desulfurization of gasoline in the so-called solutizer treatment.

My invention is based on the discovery that an improved alkaline treating solution can be obtained by the addition thereto of very small amounts of certain electrolytes. Such a solution separates from hydrocarbon liquids more rapidly and, in general, will not form troublesome emulsions.

The electrolytes which I have found to increase the rate of separation are the alkali metal sulfates and chromates or their mixtures. These electrolytes are active when dissolved in very small concentrations such as 0.1% to 0.0001%, and preferably 0.05% to 0.001%, by weight in the conventional treating solutions.

I have found also that the above electrolytes are exceptional in their action on the stability of emulsions. For example, as already stated, the sulfates and chromates of alkali metals greatly accelerate the separation, while the corresponding carbonates, thiosulfates, phosphates and chlorides have no effect or slow down the separation. Interesting is also the fact that barium isobutyrate accelerates the settling, while barium carbonate has the opposite effect.

The beneficial effect of my additions is particularly noticeable when applied to aqueous alkaline solutions containing, in addition to the alkalis, solutizers for organic acids, or to solutions of alkalis in substantially anhydrous organic solvents therefor such as the lower alcohols and alcohol-ethers, e. g. methyl, ethyl or isopropyl alcohols, ethylene glycol, propylene glycol, glycerine, diethylene glycol, ethylene glycol-monomethyl or -ethyl ethers, glycerine-mono-methyl or -ethyl ethers, etc.

Solutizers are known as organic substances which when in the liquid state are solvents for weak organic acids, are substantially insoluble in water-immiscible liquids, are soluble in aqueous strong bases, are chemically inert to the action of said bases even at elevated temperatures, and have boiling temperatures preferably substantially higher than water. Solutizers are used to enhance the extractive powers of aqueous alkaline solutions for weak organic acids such as mercaptans and phenols. The solutizer process and the various solutizers have been described in a series of patents and patent applications as well as in the general literature, for example, in the Yabroff et al. U. S. Patents 2,149,379, 2,149,380, 2,152,166 2,152,720, 2,152,723, 2,164,851, 2,186,398, 2,202,039; applications Serial Numbers 255,684, filed February 10, 1939, 271,962, filed May 5, 1939; Refiner and Natural Gasoline Manufacture, May 1939, pages 171–176, and March 1940, pages 73–76.

Industrial Engineering & Chemistry, vol. 32, pages 257–262, February 1940, etc.

In order to extract efficiently the weak organic acids, it is necessary that relatively concentrated solutions be used. As a rule, 2 to 12 normal solutions of alkali metal hydroxides are employed for this purpose. The presence of high concentrations of the alkali metal and hydroxide ions in the solutions reduces the solubilities therein of other electrolytes by several orders of magnitude. The presence of solutizers in effective concentrations, e. g. one or more normal, usually further reduces these solubilities, solutizers being organic substances and many being alkali metal salts of certain organic acids, particularly of phenols or fatty acids having 2 to 6 carbon atoms. For example, in an aqueous solution containing potassium hydroxide (6N) and potassium isobutyrate (3.1N) the solubility of potassium sulfate is only 0.01% by weight while in pure water its solubility is over 10%. In another solution containing potassium hydroxide (6N), potassium isobutyrate (1.55N) and potassium alkyl phenol (1N) the solubility of potassium chromate is 0.01% while in pure water it is 60%.

The sulfates and chromates can be dissolved and be active in these solutions at concentrations sufficiently small so as not to have a noticeable effect on the solubility relations between the alkaline solution on one hand and the organic liquids and the acids which they contain on the other hand. This is particularly important because it would be highly undesirable to reduce materially the solubility of the organic acid in the alkali inasmuch as this would reduce the extraction efficiency.

The procedure ordinarily used for extracting weak organic acids such as mercaptans from sour hydrogen liquids includes the regeneration of the spent alkaline solution containing absorbed acids. The aqueous phase, after having been contacted with the hydrocarbons and separated therefrom, is heated and subjected to steam stripping to expel the absorbed mercaptans, etc. The regenerated stripped solution is returned to the extractor to contact further amounts of sour hydrocarbons.

In principle, a solutizer solution could be used indefinitely in a continuous process with constant regeneration. In practice, however, solutions used a long time tend to form relatively stable emulsions, probably due to a gradual accumulation of emulsifiers, which emulsions either reduce the throughput or cause the carry-over of valuable solutizer. Coalescing the entrained droplets by contact with fine steel wool or other solids may not always remedy the situation. It is in such solutions used continuously for a very long period in a solutizer-desulfurization plant that the addition of sulfates or chromates in small amounts is particularly useful.

The solution containing my additions can be continuously regenerated without losing its qualities since the sulfates and chromates are insoluble in hydrocarbon liquids and cannot be stripped by the steam, so that, during the whole cycle, they always remain in the circulating aqueous phase.

The following examples illustrate the effectiveness of my improvement.

Straight run gasoline was stirred vigorously with an aqueous solution containing potassium hydroxide (6N) and potassium isobutyrate (3.1N) under standard conditions. The time necessary for the separation of the two phases was 4 minutes. After addition of 0.01% of potassium chromate to the aqueous phase the time of settling after stirring under identical conditions was reduced to two minutes.

In another test wherein cracked gasoline and an aqueous solution of potassium hydroxide (6N), potassium isobutyrate (1.55N) and potassium alkyl phenol (1.0N) were pumped countercurrent through a packed tower, the maximum rate of pumping which did not produce a carry-over was 40. ml./min. Upon addition of 0.001% w. sodium sulfate to the aqueous phase, the possible throughput increased to 125 ml./min.

1. In a process of extracting weak organic acids from their solution in a water-immiscible organic liquid by means of a liquid strong alkaline solution comprising an aqueous solution of an alkali metal hydroxide wherein said liquids are intimately contacted and thereafter separated from each other, the improvement comprising accelerating the rate of separation of said liquids by treating said organic liquid with such an alkaline solution containing dissolved between 0.1% and 0.0001% of an alkali metal chromate.

2. In the regenerative process of extracting weak organic acids from their solution in a water-immiscible organic liquid by means of a liquid strong alkaline solution comprising an aqueous solution of an alkali metal hydroxide wherein said liquids are intimately contacted and thereafter separated from each other, and the resulting spent alkaline solution is regenerated and returned for further extraction, thereby accumulating emulsifiers, the improvement comprising accelerating the rate of separation of said liquids by treating said organic liquid with such an alkaline solution containing dissolved between 0.1% and 0.0001% of an alkali metal chromate.

3. In a process of extracting mercaptans from their solution in a liquid hydrocarbon with a liquid strong alkaline solution comprising an aqueous solution of an alkali metal hydroxide wherein said liquids are intimately contacted and thereafter separated from each other, the improvement comprising accelerating the rate of separation of said liquids by treating said liquid hydrocarbon with such an alkaline solution containing dissolved between 0.1% and 0.0001% of an alkali metal chromate.

4. In a process of extracting weak organic acids from their solution in a water-immiscible organic liquid with a liquid aqueous solution of two to twelve normal alkali metal hydroxide wherein said liquids are intimately contacted and thereafter separated from each other, the improvement comprising accelerating the rate of separation of said liquids by treating said organic liquid with an alkali metal hydroxide solution containing dissolved between 0.1% and 0.0001% of an alkali metal chromate.

5. In a process of extracting weak organic acids from their solution in a water-immiscible organic liquid with a liquid aqueous solution of two to twelve normal alkali metal hydroxide containing one or more normal concentration of a solutizer, wherein said liquids are intimately contacted and thereafter separated from each other, the improvement comprising accelerating the rate of separation of said liquids by treating said organic liquids with such an alkaline solution containing dissolved between 0.1% and 0.0001% of an alkali metal chromate.

6. In a process of extracting weak organic acids from their solution in a water-immiscible organic liquid with a liquid aqueous solution of two to twelve normal alkali metal hydroxide containing one or more normal concentration of an alkali metal salt of a fatty acid having two to six carbon atoms, wherein said liquids are intimately contacted and thereafter separated from each other, the improvement comprising accelerating the rate of separation of said liquids by treating said organic liquid with such an alkaline solution containing dissolved between 0.1% and 0.0001% of an alkali metal chromate.

7. In a process of extracting weak organic acids from their solution in a water-miscible organic liquid with a liquid aqueous solution of two to twelve normal alkali metal hydroxide containing one or more normal concentration of an alkali metal salt of an alkyl phenol, wherein said liquids are intimately contacted and thereafter separated from each other, the improvement comprising accelerating the rate of separation of said liquids by treating said organic liquid with an alkaline solution containing dissolved between 0.1% and 0.0001% of an alkali metal chromate.

ALAN C. NIXON.